United States Patent
Tao et al.

(10) Patent No.: US 8,046,102 B2
(45) Date of Patent: Oct. 25, 2011

(54) CONTROL METHOD FOR SYNCHRONOUS HIGH SPEED MOTION STOP FOR MULTI-TOP LOADERS ACROSS CONTROLLERS

(75) Inventors: Jianming Tao, Troy, MI (US); H. Dean McGee, Rochester Hills, MI (US); Chi-Keng Tsai, Bloomfield Hills, MI (US); Ho Cheung Wong, Troy, MI (US); Ian Orr, Lake Orion, MI (US); Richard Motley, Lake Orion, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 1195 days.

(21) Appl. No.: 11/750,082

(22) Filed: May 17, 2007

(65) Prior Publication Data
US 2008/0288109 A1    Nov. 20, 2008

(51) Int. Cl.
*B25J 9/16* (2006.01)
*B25J 19/06* (2006.01)
(52) U.S. Cl. .......................... 700/255; 901/49
(58) Field of Classification Search .............. 700/255; 901/49; 209/584, 900; 198/370.01
See application file for complete search history.

(56) References Cited

U.S. PATENT DOCUMENTS

| | | | | |
|---|---|---|---|---|
| 3,828,225 A * | 8/1974 | Grundy | | 361/182 |
| 4,901,246 A * | 2/1990 | Meyer et al. | | 700/255 |
| 5,161,936 A * | 11/1992 | Kato | | 414/728 |
| 5,347,459 A | 9/1994 | Greenspan et al. | | |
| 6,282,460 B2 | 8/2001 | Gilliland et al. | | |
| 6,359,552 B1 * | 3/2002 | King | | 340/436 |
| 6,493,607 B1 | 12/2002 | Bourne et al. | | |
| 6,678,582 B2 | 1/2004 | Waled | | |
| 2003/0218564 A1 * | 11/2003 | Tamatsu et al. | | 342/70 |
| 2006/0129348 A1 | 6/2006 | Hooge et al. | | |
| 2006/0182536 A1 | 8/2006 | Rice et al. | | |

* cited by examiner

*Primary Examiner* — John Nguyen
*Assistant Examiner* — Kyung Kim
(74) *Attorney, Agent, or Firm* — Fraser Clemens Martin & Miller LLC; William J. Clemens

(57) ABSTRACT

A synchronous high speed motion stop for a series of multi-top loaders residing on "n" controllers on one rail achieves effective detection of the servo-error status and shut off of the trailing controller's servo power within 3 ITP time. The control method reduces the unnecessary error recovery because it only shuts off its immediate trailing controller without aborting its leading controller, allowing the leading controller to complete the cycle tasks. The cascade control method produces a synchronous high-speed motion stop for the robots across the controllers and effectively prevents the collision between the robots.

18 Claims, 1 Drawing Sheet

Synchronous High Speed Motion Stop for Multi-Top loaders Across Controllers

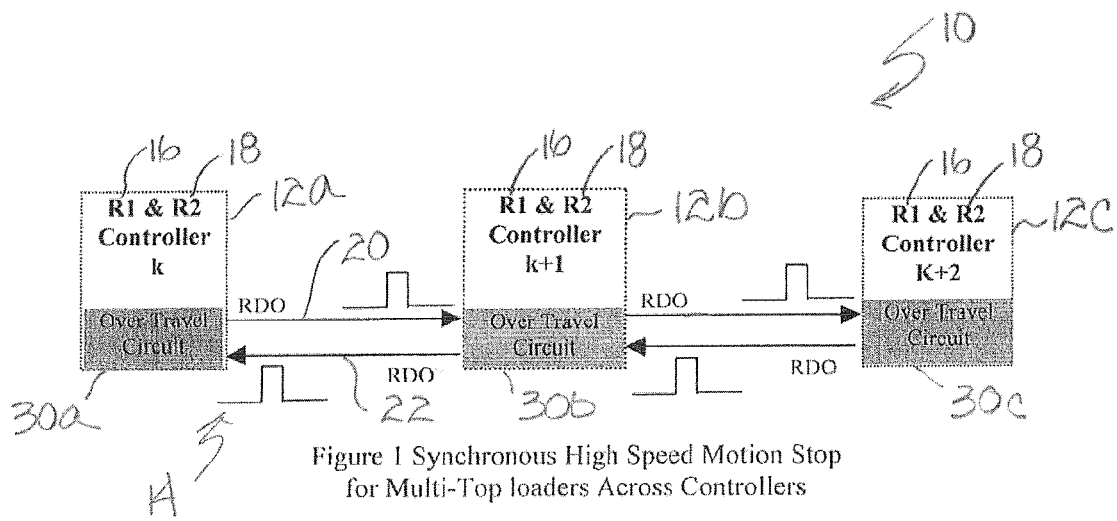
Figure 1 Synchronous High Speed Motion Stop
for Multi-Top loaders Across Controllers
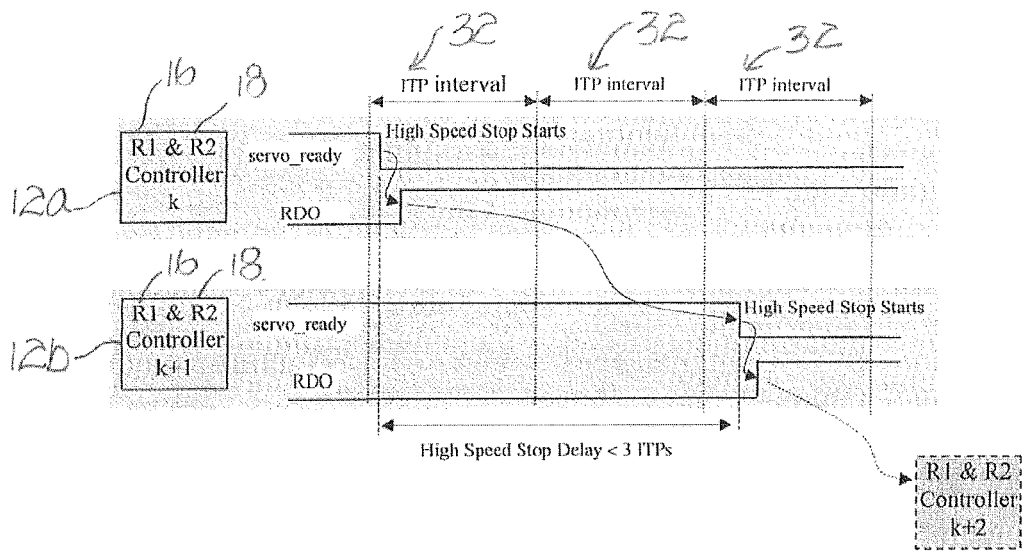
Figure 2 High Speed Stop Delay Timing Across Controllers

CONTROL METHOD FOR SYNCHRONOUS HIGH SPEED MOTION STOP FOR MULTI-TOP LOADERS ACROSS CONTROLLERS

FIELD OF THE INVENTION

The present invention relates generally to an apparatus and method for collision avoidance in multiple robot applications, and in particular to a synchronous high speed motion stop using minimum hardware and software requirements for the application.

BACKGROUND OF THE INVENTION

It is desirable to provide full collision protection for robots on the same rail at high-speed motion, with speeds as high as 3000 mm/sec along a rail direction, and small carriage separation distance, as close as 70 mm, with no additional hardware.

Previously, a method for collision avoidance for all of the robots along a rail included a controlled stop event, requiring all of the robots connected to different controllers to have the same deceleration rate. Problems emerged with this system when some robots performed an emergency stop due to an unanticipated servo error event that caused immediate servo-shut off while the remaining robots were subject to a controlled stop. This caused collisions to occur between the trailing robots and the leading robots where the controlled stop controller moved the corresponding robots to a commanded position using the programmed deceleration rate, while the emergency stop shut off the servo and resulted in a short deceleration distance for the remaining robots.

To have full protection, if one robot on the rail performs an emergency stop due to any servo error condition, then ideally the remaining robots on the same rail have to use the same emergency stop as soon as possible to avoid any collisions.

Prior systems use PLC, Ethernet Link Control and PMC/IO Link or any combination of hardware and software solutions. However, none of these solutions can provide the needed performance that can effectively protect against collision. A PLC control takes too long to detect the servo error condition from one controller and then take the proper action to stop the robots in different controllers. Additional hardwire connections from the PLC to each controller are also required.

The disadvantage of an Ethernet Control Link is that the non-deterministic transmission delay time across the controller can result in a collision. The disadvantage of a PMC/IO Link is the cost and delay. This type of link is too costly to make the hardware connections among all the controllers. Further, the delay time is large where the Master PC resides on one controller only.

U.S. Pat. No. 5,347,459 discloses a method for detecting a collision between a robot and one or more obstacles before it occurs. Generally, a plurality of voxels defines a finite work space and each grid element is assigned a value representing the relative strength and distance of the robotic manipulator to an object and subsequent collision potential. The robot is modeled by spheres in a voxelized workspace. Each voxel within the workspace is assigned a value which corresponds to its distance from the closest obstacle. A collision is determined to be imminent if the voxel value at the center of a sphere is less than the radius of the sphere in voxels.

U.S. Pat. No. 6,282,460 discloses a method for preventing collisions between robots using a central controller to communicate with each robot. Each robot is programmed to automatically stop when the robot reaches a certain point in the operation.

The central controller causes a first robot to stop or pause so that a second robot may safely complete an operation. The central controller allows the robots to resume operations when it has been determined that the robots have reached their respective correct positions. The method includes using a pendant controller to provide stop commands to a robot as instructed by an operator.

U.S. Pat. No. 6,493,607 discloses a collision checking system which can be performed in order to determine if a collision will likely result by simulating movement of the robot in accordance with a general motion plan developed from the motion of a robot within a free space confined by obstacles. The collision checking system provides a pre-determined collision-free path of at least one fixed robot within a confined work area.

U.S. Pat. No. 6,678,582 discloses a method of avoiding collisions between robots based on continuous predicted configurations and forecasted stopping distances. The method allows for automatic configuration of the work space from a collision avoidance standpoint. It determines automatically which components have potential collisions with which other components by predicting the configurations of the moving components over a period of time sufficient enough to allow the machines to stop safely and check for interference. If a collision is predicted, the machines are commanded to stop on or off their paths.

U.S. Pat. App. Publication No. 20060129348 discloses a system for collision avoidance of rotary atomizers by measuring both the drive-side motion quantities of the drive system, and the driven side quantities, i.e., on the driven mechanism. The dynamic model contemplates the inertia of various components of the system, the elastic components, and the frictional forces or moments of the drive system and the mechanism, respectively. For disturbance-free operation of the drive system, the two comparison values must agree, while a deviation between the two comparison values can indicate a disturbance or even a collision. A monitoring device is provided for each shaft of the robot to recognize any deviation of the actual behavior of the drive system from the modeled behavior.

U.S. Pat. App. Publication No. 20060182536 discloses a Cartesian robot cluster tool architecture that includes at least two robots for performing a task within a confined workspace. A collision avoidance system includes a system controller that monitors the position of each of the robots by use of various sensors positioned on the robot(s) or in the cluster tool during the transferring process to avoid a collision. The system controller is adapted to actively alter the motion and/or trajectory of each of the robots during the transferring process to avoid a collision and minimize the transfer path length. Preferably, the disclosure provides a cluster tool configuration so that if one of the robots becomes inoperable the system can still continue using the other robots. This configuration also removes, or minimizes, the need for collision avoidance type control features since the physical overlap of robots that are positioned next to each other is eliminated.

SUMMARY OF THE INVENTION

The present invention overcomes all the shortcoming of previous methods and apparatuses by providing a new control method and apparatus that requires no additional central controls such as a PLC or PMC. The new control method and apparatus requires a minimum hardware connection via a Robot Digital I/O connection where each controller only needs to communicate to its upstream and downstream controller. The new control method and apparatus can effectively detect the servo-error status and shut off the servo power to the corresponding trailing controller within three (3) Interpolate loop times (ITP's).

A further advantage of the present invention is that the method and apparatus reduces the unnecessary error recovery where only the immediate trailing controller is shut off without aborting the corresponding leading controllers, allowing the leading controllers to complete their cycle tasks. This cascade control method and apparatus advantageously produces a synchronous high-speed motion stop for each affected robot across the controllers while effectively preventing a collision between them.

In a preferred embodiment of the present invention, the apparatus and method include a synchronous high-speed motion stop comprising:
  at least two multi-top loaders;
  a controller associated with each of said multi-top loaders;
  a single rail supporting said multi-top loaders in series along said rail; and
  a control method controlling said controller for performing a cascading high speed stop of said multi-top loaders on said rail, wherein said cascading high speed stop comprises the steps of:
    a. an unanticipated event occurring at one of said multi-top loaders associated with said controller;
    b. posting of an error resulting from the event at the current interpolate loop time of said one of said multi-top loaders;
    c. a motion control system starts performing a high speed stop within the same interpolate loop time to said one of said multi-top loaders;
    d. the motion control system sending a control signal via a hardwired robot digital output to the immediate trailing robot controller; and
    e. the control signal triggering the over travel circuit of the trailing robot controller.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 illustrates a schematic of a preferred method and apparatus according to the present invention; and FIG. 2 illustrates the timing relationship between a leading and a trailing controller according to the present invention.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

With reference to FIG. 1, there is shown a preferred embodiment of the method and apparatus of the synchronous high-speed motion stop 10 of the present invention as applied to a three controller configuration 12a, 12b, 12c on one rail 14. Each controller 12a, 12b, 12c is connected to one pair of robots, "R1" 16 and "R2" 18 and connects to its upstream or downstream controller via a Robot Digital Output (RDO) 20, 22. The RDO 20, 22 can send a pulse with adjustable width at 24 volts. The pulse of 24 volts will trigger an Over Travel Circuit 30a, 30b, 30c to cause immediate servo shut off for the robots R1 16, R2 18 connected to the corresponding controller 12a, 12b, and/or 12c.

FIG. 2 illustrates the timing relationship of the synchronous high-speed motion stop between a leading and a trailing controller. The controller "k" 12a represents the leading controller and the controller "k+1" 12b represents the trailing controller. Each controller 12a, 12b controls two coordinated robots R1 16 and R2 18. An ITP interval 32 refers to the controller's interpolate loop time. In the preferred embodiment, the interpolate loop time is 12 milliseconds (12 ms). The high level of servo status signal represent the normal operation of the controller and the low level of the servo status indicates the error status which will cause the controller to shut off the servo power. The low level of the RDO indicates a 0 volt magnitude of the digital output and the high level indicates a 24 volt output. The timing chart of FIG. 2 shows that a servo error for a leading controller will result in a servo error occurring for the trailing controller within three ITP's of time.

In a preferred embodiment of the present method, the control sequence set forth below gives a generic control method for a series of the multi-top loaders residing on "n" controllers on one rail. With reference to FIGS. 1 and 2, the method is as follows.

Sequence of the control:
1. Unanticipated event such as servo error occurs on a robot or robots for controller "k".
2. Motion control system (filter task) posts servo error at current ITP to robot (R1) or other robots (R2) that have coordinated motion within controller "k".
3. Motion control system starts to perform high speed stop within the same ITP to robot (R1) or other robots (R2)_ that have coordinated motion within controller "k".
4. Motion control system sends a control signal via a hardwired Robot Digital Output (RDO) to its immediate trailing robot controller "k+1".
5. This control signal will trigger the Over Travel (OT) circuit of the robot controller "k+1".
6. Motion system of the controller "k+1" will post a servo error within the same ITP.
7. Controller "k+1" shuts off drive power to the servo system and applies robot brakes to robot (R1) or other robots (R2) that have coordinated motion in controller "k+1".
8. If the current controller is the last one, i.e. k=n, then go to next step, other wise let k=k+1 and repeat step 4.
9. Exit.

Results show a delay time of 26 ms between the leading and trailing controller during the synchronous high-speed motion stop.

The Synchronous High Speed Motion Stop achieves effective detection of the servo-error status and shut off of trailing controller's servo power within 3 ITP's time. This control method reduces the unnecessary error recovery because it only shuts off its immediate trailing controller without aborting its leading controller, allowing the leading controller to complete the cycle tasks. This cascade control method produces a synchronous high-speed motion stop for the robots across the controllers and effectively prevents the collision between the robots.

The control method for synchronous high speed motion stop for multi-top loaders across controllers control methodology may be applied to general applications such as interference avoidance for multiple robots applications such as body shop and RPT applications.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A control method for a series of multi-top loaders residing on "n" controllers on one rail, comprising the steps of:
    a. an unanticipated event occurring at a first robot associated with a first controller;
    b. posting of an error resulting from the event at a current interpolate loop time of the first robot;
    c. starting a motion control system to perform a high speed stop within the same interpolate loop time of the first robot;
    d. the motion control system sending a control signal via a hardwired robot digital output to an immediate trailing controller; and
    e. the control signal triggering an over travel circuit of the trailing controller.

2. The control method of claim 1, and further comprising the step of after the control signal triggering the over travel circuit, a motion control system of the trailing controller posting an error within the same interpolate loop time.

3. The control method of claim 2, and further comprising the step of after the trailing controller performing a high speed stop comprising motion control system posting the error, the trailing controller shutting off drive power to a servo system and applying robot brakes to a robot associated with the trailing controller.

4. The control method of claim 3, and further comprising the step of after performing a high speed stop comprising shutting off drive power and applying robot brakes to the trailing controller robot, if the trailing controller is a last one in a series of "n" controllers, then exiting the program.

5. The control method of claim 3, and further comprising the step of after performing a high speed stop comprising shutting off drive power and applying robot brakes to the trailing controller robot, if said trailing controller is not a last one in a series of "n" controllers, repeating said step d.

6. A control method for a series of multi-top loaders residing on "n" controllers on one rail, comprising the steps of:
    a. an unanticipated event occurring at least two robots associated with a first controller;
    b. posting of an error resulting from the event at a current interpolate loop time of the at least two robots;
    c. starting a motion control system to perform a high speed stop within the same interpolate loop time of the at least two robots;
    d. the motion control system sending a control signal via a hardwired robot digital output to an immediate trailing controller; and
    e. the control signal triggering an over travel circuit of the trailing controller.

7. The control method of claim 6, and further comprising the step of after a control signal triggering the over travel circuit, a motion system of the trailing controller posting an error within the same interpolate loop time.

8. The control method of claim 7, and further comprising the step of after posting an error by the trailing controller, the trailing controller performing a high speed stop comprising shutting off drive power to a servo system and applying robot brakes to all robots associated with the trailing controller.

9. The control method of claim 8, and further comprising the step of after performing a high speed stop comprising shutting off drive power and applying robot brakes, if the trailing controller is a last one in a series of "n" controllers, then exiting the program.

10. The control method of claim 8, and further comprising the step of after performing a high speed stop comprising shutting off drive power and applying robot brakes, if the trailing controller is not a last one in a series of "n" controllers, repeating said step d.

11. A synchronous high-speed motion stop apparatus comprising:
    at least two multi-top loaders;
    a controller associated with each of said multi-top loaders;
    a single rail supporting said multi-top loaders in series along said rail; and
    said controllers configured for performing a cascading high speed stop of said multi-top loaders on said rail, wherein said cascading high speed stop comprises the steps of:
    a. an unanticipated event occurring at one of said at least two multi-top loaders;
    b. posting of an error resulting from the event at a current interpolate loop time of said one multi-top loader;
    c. starting a motion control system to perform a high speed stop within the same interpolate loop time of the one multi-top loader;
    d. the motion control system sending a control signal via a hardwired robot digital output to an immediate trailing one of the controllers; and
    e. the control signal triggering the over travel circuit of the trailing controller.

12. The synchronous high-speed motion stop apparatus of claim 11, wherein said interpolate loop time is 12 milliseconds.

13. The synchronous high-speed motion stop apparatus of claim 11, wherein said multi-top loaders travel with speeds as high as 3000 mm/sec along said rail.

14. The synchronous high-speed motion stop apparatus of claim 11, wherein said multi-stop loaders are located within 70 mm of each other along said rail.

15. The synchronous high-speed motion stop apparatus of claim 11, said control method further comprising the step of the motion system of the trailing controller posting an error within the same interpolate loop time.

16. The synchronous high-speed motion stop apparatus of claim 15, and further comprising the step of after posting the error, the trailing controller performing a high speed stop comprising shutting off drive power to a servo system and applying robot brakes to an associated one of the at least two multi-top loaders.

17. The synchronous high-speed motion stop apparatus of claim 16, and further comprising the step of after performing a high speed stop comprising shutting off drive power and applying robot brakes, if the trailing controller is a last one in a series of "n" controllers, then exiting the program.

18. The synchronous high-speed motion stop apparatus of claim 16, and further comprising the step of after performing a high speed stop comprising shutting off drive power and applying robot brakes, if the trailing controller is not a last one in a series of "n" controllers, repeating said step d.

* * * * *